(12) United States Patent
Wegener et al.

(10) Patent No.: US 11,427,729 B2
(45) Date of Patent: Aug. 30, 2022

(54) COATING MATERIALS GENERATING STRUCTURED SURFACES

(71) Applicant: BASF Coatings GmbH, Münster (DE)

(72) Inventors: Elke Wegener, Muenster (DE); Andreas Janssen, Muenster (DE); Maria Del Rosario Magarinos, Guadalajara (ES)

(73) Assignee: BASF Coatings GmbH, Münster (DE)

( * ) Notice: Subject to any disclaimer, the term of this patent is extended or adjusted under 35 U.S.C. 154(b) by 403 days.

(21) Appl. No.: 16/604,659

(22) PCT Filed: Apr. 10, 2018

(86) PCT No.: PCT/EP2018/059141
§ 371 (c)(1),
(2) Date: Oct. 11, 2019

(87) PCT Pub. No.: WO2018/189166
PCT Pub. Date: Oct. 18, 2018

(65) Prior Publication Data
US 2020/0157377 A1    May 21, 2020

(30) Foreign Application Priority Data

Apr. 11, 2017 (EP) .................... 17165903

(51) Int. Cl.
| | | |
|---|---|---|
| *C09D 177/02* | (2006.01) | |
| *C09D 7/40* | (2018.01) | |
| *C09D 7/42* | (2018.01) | |
| *C09D 5/28* | (2006.01) | |
| *C09D 129/02* | (2006.01) | |

(Continued)

(52) U.S. Cl.
CPC .............. *C09D 177/02* (2013.01); *C09D 5/28* (2013.01); *C09D 7/42* (2018.01); *C09D 7/69* (2018.01); *C09D 129/02* (2013.01); *C09D 133/10* (2013.01); *C08K 5/20* (2013.01); *C08K 5/21* (2013.01)

(58) Field of Classification Search
CPC .......... C08L 33/00; C08L 33/02; C08L 33/04; C08L 33/06; C08L 33/08; C08L 33/10; C08L 33/12; C08L 33/14; C08L 33/16; C08L 75/00; C08L 75/02; C08L 75/04; C08L 75/06; C08L 75/08; C08L 75/10; C08L 75/12; C08L 75/14; C08L 75/16; C08L 77/00; C08L 77/02; C08L 77/04; C08L 77/06; C08L 77/08; C08L 77/10; C08L 77/12; C09D 177/00; C09D 177/02; C09D 177/04; C09D 177/06; C09D 177/08; C09D 177/10; C09D 177/12; C09D 175/00; C09D 175/02; C09D 175/04; C09D 175/06; C09D 175/08; C09D 175/10; C09D 175/12; C09D 175/14; C09D 175/16; C09D 113/00; C09D 133/02; C09D 133/04; C09D 133/08; C09D 133/10; C09D 133/12; C09D 133/14; C09D 133/01; C09D 129/00; C09D 129/02; C09D 129/04; C09D 129/06; C09D 129/08; C09D 129/10; C09D 129/12; C09D 129/14; C09D 7/42; C09D 7/45; C09D 7/67; C09D 7/68; C09D 7/69; C09D 7/70; C09D 5/28; C08K 5/17; C08K 5/175; C08K 5/20; C08K 5/205
See application file for complete search history.

(56) References Cited

U.S. PATENT DOCUMENTS

| | | | |
|---|---|---|---|
| 4,598,131 A | 7/1986 | Prucnal | |
| 4,710,542 A | 12/1987 | Forgione | |

(Continued)

FOREIGN PATENT DOCUMENTS

| | | | |
|---|---|---|---|
| DE | 3706860 A1 | 9/1988 | |
| DE | 19810900 A1 | 9/1999 | |

(Continued)

OTHER PUBLICATIONS

English translation of International Search Report for International Application No. PCT/EP2018/059141, dated May 25, 2018, 3 pages.

*Primary Examiner* — Christopher M Rodd
(74) *Attorney, Agent, or Firm* — Armstrong Teasdale LLP

(57) ABSTRACT

Disclosed are coating material compositions including (i) at least one polyol component (A), (ii) at least one crosslinking agent component (B) having groups reactive toward hydroxyl groups of component (A), (iii) at least one polyamide component (P1) in which the acid amide groups are connected by a saturated, aliphatic hydrocarbyl radical having 6 to 10 carbon atoms. Component (P1) is used in particulate form in which a size distribution ($D_{50}$) is 20 to 100 μm. The coating material compositions further include (iv) at least one polycarboxamide component (P2) possessing the following structural formula

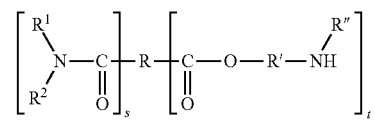

in which s is 1, 2 or 3, t is 0 or 1, s+t is 2 or 3, R is a specific (s+t)-valent organic radical, and at least one of the radicals $R^1$ and $R^2$ carries at least one hydroxyl group. Also disclosed are methods of producing the coating material compositions.

19 Claims, No Drawings

(51) Int. Cl.
*C09D 133/10* (2006.01)
*C08K 5/20* (2006.01)
*C08K 5/21* (2006.01)

(56) References Cited

U.S. PATENT DOCUMENTS

| | | | |
|---|---|---|---|
| 4,857,111 A | 8/1989 | Haubennestel et al. | |
| 4,939,213 A | 7/1990 | Jacobs, III | |
| 5,362,448 A | 11/1994 | Kawakami et al. | |
| 5,907,006 A * | 5/1999 | Rennie | C09D 7/42 |
| | | | 524/223 |
| 6,162,889 A * | 12/2000 | Orikabe | C08G 18/69 |
| | | | 528/75 |
| 6,276,400 B1 * | 8/2001 | Jackson | B05C 19/025 |
| | | | 138/137 |
| 6,686,412 B1 | 2/2004 | Berschel et al. | |
| 2003/0027921 A1 | 2/2003 | Speier et al. | |
| 2018/0066141 A1 | 3/2018 | Roland | |

FOREIGN PATENT DOCUMENTS

| | | |
|---|---|---|
| DE | 19917228 A1 | 10/2000 |
| EP | 0245700 A2 | 11/1987 |
| EP | 0281124 A2 | 9/1988 |
| EP | 0692007 A1 | 1/1996 |
| EP | 0826750 A1 | 4/1998 |
| EP | 0994117 A1 | 4/2000 |
| EP | 1088037 A1 | 4/2001 |
| EP | 1273640 A2 | 1/2003 |
| EP | 2072585 A1 | 6/2009 |
| JP | 8319439 A | 12/1996 |
| JP | 10219188 A | 8/1998 |
| JP | 2002327150 A | 11/2002 |
| JP | 2006219731 A | 8/2006 |
| WO | 0109260 A1 | 2/2001 |
| WO | 2008031589 A2 | 3/2008 |
| WO | 2010147690 A2 | 12/2010 |
| WO | 2016156953 A1 | 10/2016 |
| WO | 2017202692 A1 | 11/2017 |

* cited by examiner

COATING MATERIALS GENERATING STRUCTURED SURFACES

CROSS-REFERENCE TO RELATED APPLICATIONS

This application is a U.S. National Phase Application of PCT/EP2018/059141, filed Apr. 10, 2018, which claims the benefit of priority to EP Application No. 17165903.0, filed Apr. 11, 2017, the contents of which are hereby expressly incorporated by reference in their entirety.

The present invention relates to coating materials for producing structured surfaces, more particularly for producing structured clearcoat systems, and to a process for producing the coating materials. The invention further relates to multicoat paint systems comprising a coating film obtained from the coating material of the invention. A further subject of the invention is the use of a combination of two different amides as additives for coating material compositions.

There has long been a demand for coating materials for producing structured surfaces that form stable coating material compositions even without addition of customary matting additives such as silicas, for example, and from which it is possible to obtain, in particular, clearcoat systems which are rough and, preferably, nevertheless also lustrous.

Known from EP-A-1 088 037 are coating material compositions, more particularly automotive paints, which are obtained using matting and/or structuring agent preparations in paste form. The pastes here are intended not to exhibit any sedimentation even on prolonged storage. The matting pastes comprise a matting agent based on fumed silica, while the structuring pastes comprise not only fumed silica as matting agent but also a structuring agent based on polyamide pellets. The structuring paste serves for producing a two-component paint from a base varnish and a polyisocyanate having free isocyanate groups, as curing agent, for the painting of plastics substrates.

Similar structuring pastes based on fumed silica and a polyamide powder in combination with cellulose acetobuyrate for the production of coating materials have also already been described, in DE 198 10 900 C2.

With the coating material compositions described above, however, the use of so-called structuring pastes and matting pastes is a mandatory requirement. In any case, the focus with these compositions is on the matting effect. Coating material compositions which are stabilized with respect to sedimentation and which contain no matting agent fraction have not been described.

It was an object of the present invention to provide a coating material which is stable with respect to sedimentation and which forms structured coating films, more particularly clearcoat films, which manage without any significant fraction of fumed silica or the use of structuring pastes. The paint systems obtained from the coating material compositions of the invention ought meet all requirements of high-quality paint systems, especially the requirements in terms of automotive OEM finishes or automotive refinishes. They ought in particular to exhibit high circulation line stability and to result in paint systems having particularly regular surface structure, high scratch resistance, and chemical resistance. The intention is also that blushing after a constant condensation conditions test (CCC test) be minimized.

Surprisingly it has been found that the above objects are achieved by means of coating material compositions comprising (i) at least one polyol component (A),
(ii) at least one crosslinking agent component (B) having groups reactive toward hydroxyl groups of component (A),
(iii) at least one polyamide component (P1) wherein the acid amide groups are connected by a saturated, aliphatic hydrocarbyl radical having 6 to 10 carbon atoms, said component being used in a particulate form wherein the size distribution of the primary particles, determined by laser diffraction, possesses a particle size median ($D_{50}$) of 20 to 100 μm, and
(iv) at least one polycarboxamide component (P2), wherein the polycarboxamide component (P2) possesses the following structural formula

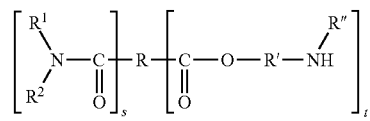

in which
s is 1, 2 or 3,
t is 0 or 1, and
s+t is 2 or 3,
R is an (s+t)-valent organic radical selected from the group consisting of
(a) aliphatic hydrocarbon groups having 2 to 60 carbon atoms,
(b) aliphatic or aliphatic-aromatic radicals containing 2 to 8 carboxamide groups and additionally 6 to 150 carbon atoms in the form of hydrocarbyl radicals, and
(c) aliphatic radicals containing 2 to 75 ether groups (—O—) and additionally 4 to 150 carbon atoms in the form of hydrocarbyl radicals,
(d) aromatic hydrocarbon groups having 6 to 20 carbon atoms,
$R^1$ is hydrogen or $C_nH_{2n}R^3$, in which n is 2 to 6 and $R^3$ is hydrogen or a radical of the structure $(X)_p$—$R^4$, in which p is 0 or 1 and, if p is 0, the radical $R^4$ is OH, and, if p is 1, the radical X is an oxygen atom or a carboxylic ester group, and $R^4$
  i. is an aliphatic hydrocarbyl radical containing 1 to 3 hydroxyl groups and having 2 to 80 carbon atoms, or
  ii. is an aliphatic radical containing 1 to 3 hydroxyl groups, containing 0 to 39 groups selected from the group of ether groups (—O—) and carboxylic ester groups, and additionally containing 2 to 80 carbon atoms in the form of hydrocarbyl radicals,
and $R^2$ is a radical $C_nH_{2n}$—$(X)_p$—$R^4$; and
—R'—NH—R" is
a radical —$C_nH_{2n}$—NH—$C_nH_{2n}$—$(X)_p$—$R^4$,
a radical —$R^{4'}$—X—$C_nH_{2n}$—NH—$R^1$ or
a radical —$R^{4'}$—X—$C_nH_{2n}$—NH—$C_nH_{2n}$—$(X)_p$—$R^4$,
in which
$R^{4'}$ is an aliphatic hydrocarbyl radical containing 0 to 2 hydroxyl groups and having 2 to 80 carbon atoms, or
$R^{4'}$ is an aliphatic radical containing 0 to 2 hydroxyl groups, containing 0 to 39 groups selected from the group of ether groups and carboxylic ester groups, and additionally containing 2 to 80 carbon atoms in the form of hydrocarbyl radicals.

Polyol Component (A)

Employed as polyol component (A) are, preferably, oligomeric and/or polymeric polyols. Low molecular mass polyols may be admixed in minor proportions to the oligomers and/or polymers of the polyol component (A).

Low molecular mass polyols are, for example, low molecular mass diols, such as, preferably, ethylene glycol, neopentyl glycol, 1,2-propanediol, 2,2-dimethyl-1,3-propanediol, 1,4-butanediol, 1,3-butanediol, 1,5-pentanediol, 2,2,4-trimethyl-1,3-pentanediol, 1,6-hexanediol, 1,4-cyclohexanedimethanol and 1,2-cyclohexanedimethanol, and also low molecular mass polyols, such as, preferably, trimethylolethane, trimethylolpropane, trimethylolhexane, 1,2,4-butane-triol, pentaerythritol, and dipentaerythritol.

The preferred oligomeric and/or polymeric polyols of the polyol component (A) preferably have weight-average molecular weights $M_w$>500 g/mol, measured by GPC (gel permeation chromatography, 25° C.), more preferably of 800 to 100 000 g/mol, more particularly of 1000 to 50 000 g/mol.

Particularly preferred are polyester polyols, polyurethane polyols, polysiloxane polyols, and, in particular, poly(meth)acrylate polyols. The term "(meth)acryl . . . " herein stands both for "acryl . . . " and for "methacryl . . . ". Poly(meth)acrylates, accordingly, may be polyacrylates, polymethacrylates or else copolymers of acrylates and methacrylates. Furthermore, poly(meth)acrylates may comprise in copolymerized form, in addition to the acrylates and methacrylates, the corresponding free acids (acrylic acid and/or methacrylic acid) and also further ethylenically unsaturated monomers.

The polyol component (A) preferably has a hydroxyl number of 80 to 250 mg KOH/g, more particularly of 100 to 220 KOH/g, and very preferably of 150 to 200 mg KOH/g. The hydroxyl number (OH number) indicates the number of mg of potassium hydroxide that are equivalent to the amount of acetic acid bound in the acetylation of 1 g of substance. For the determination, the sample is boiled with acetic anhydride-pyridine, and the resultant acid is titrated with potassium hydroxide solution (DIN 53240-2:2007-11).

The glass transition temperatures of the polyols in the polyol component (A), measured by DSC (differential scanning calorimetry) in accordance with DIN EN ISO 11357-2:2014-07 at a heating rate of 10° C./min, are preferably between −150 and 100° C., more preferably between −120° C. and 80° C., and very preferably between −50° C. and 40° C. or between −40° C. and 35° C.

Typical polyester polyols suitable herein are described for example in EP-A-0994117 and EP-A-1273640.

Typical suitable polyurethane polyols are prepared preferably by reaction of polyester polyol prepolymers with suitable di- or polyisocyanates and are described for example in EP-A-1273640.

Typical suitable polysiloxane polyols are described for example in WO-A-01/09260; the polysiloxane polyols recited therein may be employed preferably in combination with further polyols, especially those having relatively high glass transition temperatures.

The poly(meth)acrylate polyols especially preferred in accordance with the invention are generally copolymers and preferably have weight-average molecular weights $M_w$ of 1000 to 20 000 g/mol, more particularly of 1500 to 10 000 g/mol, and more preferably 3000 to 7000 g/mol, measured in each case by the GPC method indicated above.

The glass transition temperature Tg of the preferred poly(meth)acrylate polyols of the polyol component (A) is preferably from −100 to 100° C. and more preferably between −50° C. and 50° C. The glass transition temperature is determined by the DSC method indicated above.

The poly(meth)acrylate polyols preferably have a hydroxyl number of 80 to 250 mg KOH/g, more particularly of 100 to 220 KOH/g, and very preferably of 150 to 200 mg KOH/g.

The poly(meth)acrylate polyol component (A) preferably has an acid number of 0 to 30 mg KOH/g, more preferably 3 to 10 mg KOH/g. The acid number here indicates the number of mg of potassium hydroxide consumed in the neutralization of 1 g of the poly(meth)acrylate polyol component (A) (DIN EN ISO 2114:2002-06).

Hydroxyl-containing monomer building blocks employed are preferably hydroxyalkyl acrylates and/or hydroxyalkyl methacrylates, such as, in particular, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, and, in particular, 4-hydroxybutyl acrylate and/or 4-hydroxybutyl methacrylate.

Further monomer building blocks used for the polyacrylate polyols are preferably alkyl acrylates and/or alkyl methacrylates, such as, preferably, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl methacrylates, such as cyclopentyl acrylate, cyclopentyl methacrylate, isobornyl acrylate, isobornyl methacrylate or, in particular, cyclohexyl acrylate and/or cyclohexyl methacrylate.

Other monomer building blocks which can be used for the polyacrylate polyols include vinylaromatic hydrocarbons, such as vinyltoluene, alpha-methylstyrene or, in particular, styrene, amides or nitriles of acrylic or methacrylic acid, vinyl esters or vinyl ethers, and also, in minor amounts, in particular, acrylic and/or methacrylic acid.

Crosslinking Agent Component (B)

As component (B), the coating materials of the invention comprise at least one compound having groups reactive toward hydroxyl groups. Crosslinking agents which can be used in this context are all commonly used crosslinking agents which have groups reactive toward hydroxyl groups. Examples of suitable crosslinking agents are anhydride-functional compounds, amino resins, tris(alkoxycarbonylamino)triazines and their derivatives, compounds having free, i.e., nonblocked, and/or blocked isocyanate groups, and/or epoxy-functional compounds. Mixtures of different crosslinking agents can also be used here.

Useful as component (B) for example are amino resins and/or epoxy resins. Preference in this case is given to aliphatic epoxy resins, which have high weathering stability. Such epoxy resins are described for example in the B. Ellis monograph "Chemistry and Technology of Epoxy Resins" (Blackie Academic & Professional, 1993, pages 1 to 35). Also contemplated as component (B), in place of the epoxy resins or together with the epoxy resins, are the customary and known amino resins some of whose methylol and/or methoxymethyl groups may have been defunctionalized by means of carbamate or allophanate groups. Crosslinking agents of this kind are described in patent specifications U.S. Pat. No. 4,710,542 and EP-B-0 245 700 and also in the B. Singh and coworkers article "Carbamylmethylated Melamines, Novel Crosslinkers for the Coatings Industry" in Advanced Organic Coatings Science and Technology Series, 1991, volume 13, pages 193 to 207.

As component (B) it is also possible to use tris(alkoxycarbonylamino)triazines and their derivatives. Suitable tris (alkoxycarbonylamino)triazines are described for example in U.S. Pat. No. 4,939,213, column 2, line 33, to column 7, line 63, in U.S. Pat. No. 5,084,541, column 2, line 51, to column 7, line 63, and in EP-A-0624577, column 3, line 33, to column 16, line 5. Suitable tris(alkoxycarbonylamino) triazines are also available commercially under the name Larotact® LR 9018 from BASF SE.

The coating materials of the invention preferably comprise, in the crosslinking agent component (B), one or more crosslinking agents having free, i.e., nonblocked, and/or blocked isocyanate groups, and/or amino resins, and/or tris(alkoxycarbonylamino)triazines.

Preferably, the coating materials of the invention, in component (B), comprise crosslinking agents having free and/or blocked isocyanate groups, optionally together with further crosslinking agents, in particular with amino resins and/or tris(alkoxycarbonylamino)triazines. Crosslinking agents having blocked isocyanate groups are used preferably in component (B) when the coating materials of the invention are employed as one-component (1K) systems. Particularly preferred, however, is the use of crosslinking agents containing free isocyanate groups.

Examples of preferred compounds of component (B) containing isocyanate groups are conventional substituted or unsubstituted aromatic, aliphatic, cycloaliphatic and/or heterocyclic polyisocyanates, preference being given to using aliphatic and/or cycloaliphatic polyisocyanates. Examples of preferred aliphatic and/or cycloaliphatic polyisocyanates are as follows: tetramethylene 1,4-diisocyanate, hexamethylene 1,6-diisocyanate, 2,2,4-trimethylhexane 1,6-diiso-cyanate, isophorone diisocyanate, ethylene diisocyanate, dodecane 1,12-diisocyanate, cyclobutane 1,3-diisocyanate, cyclohexane 1,3-diisocyanate, cyclohexane 1,4-diisocyanate, methylcyclohexyl diisocyanate, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g. Desmodur® W from Bayer AG), tetramethylxylyl diisocyanates (e.g., TMXDI® from American Cyanamid), and mixtures of the aforesaid polyisocyanates.

Further-preferred crosslinking agents of component (B) are the dimers and trimers, more particularly the uretdione dimers, biuret dimers, and the isocyanurate trimers, of the aforesaid diisocyanates.

Particularly preferred crosslinking agents of component (B) are hexamethylene 1,6-diisocyanate (HDI), isophorone diisocyanate (IPDI), and 4,4'-methylenedicyclohexyl diisocyanate, their uretdione dimers, biuret dimers and/or isocyanurate trimers. Especially preferred are the isocyanurate trimers of hexamethylene 1,6-diisocyanate.

In a further embodiment of the invention, the polyisocyanates are polyisocyanate prepolymers having urethane structural units, which are obtained by reaction of polyols with a stoichiometric excess of aforesaid polyisocyanates. Polyisocyanate prepolymers of this kind are described for example in U.S. Pat. No. 4,598,131.

The Ratio of Components (A) and (B)

The weight fraction of the hydroxyl-containing compounds (A) to be used, based on the weight fraction of the isocyanate group-containing compounds (B), is dependent on the hydroxyl equivalent weight of the polyol and on the equivalent weight of the compound (B)—in other words, in the case of the polyisocyanates used preferably as component (B), on the equivalent weight of the free isocyanate groups of the polyisocyanate (B).

The coating materials of the invention comprise preferably between 30 to 70 wt %, preferably 40 to 60 wt %, and more preferably 45 to 55 wt %, based in each case on the nonvolatile constituents of the coating material, of at least one hydroxyl-containing compound (A), and/or preferably between 20 to 50 wt %, preferably 25 to 45 wt %, and more preferably 30 to 40 wt %, based in each case on the nonvolatile constituents of the coating material, of at least one crosslinking agent (B). The nonvolatile fraction of the coating material is determined by drying a coating material sample (1 g) at 125° C. for 60 minutes.

The weight fractions of the polyol (A) and of the crosslinking agent (B), preferably of the polyisocyanate (B), are preferably selected such that the molar equivalent ratio of the reactive groups of component (B) (in other words, in the case of the polyisocyanates, of the isocyanate groups of the compounds (B)) to the hydroxyl groups of the hydroxyl-containing compounds (A) is between 0.7:1 and 1:1.3, preferably between 0.8:1 and 1.2:1, more preferably between 0.9:1 and 1.1:1.

Where the coating materials are one-component coating materials, the isocyanate group-containing compounds (B) selected are those whose free isocyanate groups are blocked with the customary blocking agents. The free isocyanate groups may be blocked, for example, with substituted pyrazoles, more particularly with alkyl-substituted pyrazoles, such as 3-methylpyrazole, 3,5-dimethylpyrazole, 4-nitro-3,5-dimethylpyrazole, 4-bromo-3,5-dimethylpyrazole, and the like.

Especially preferably the isocyanate groups of component (B) are blocked with 3,5-dimethylpyrazole.

Polyamide Component (P1) and Polycarboxamide Component (P2)

The coating material composition of the invention comprises two mutually different amide components, a polyamide component (P1), which is obtainable from a mono-aminomonocarboxylic acid or lactam thereof by polycondensation or ring-opening polymerization, respectively, and a polycarboxamide component (P2), which is obtainable from dicarboxylic and/or tricarboxylic acids, their esters or anhydrides, and hydroxy-functional amines.

Polyamide Component (P1)

The polyamide component (P1) may be prepared for example by ring-opening polymerization of lactams of the following formula (I):

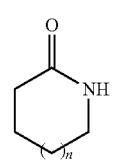

(I)

in which n is 6 to 10, preferably 7 to 9, and more preferably 8. The ring-opening polymerization may be initiated by addition of water at elevated pressure and elevated temperature. A corresponding process for n=8 (laurolactam) is disclosed for example in U.S. Pat. No. 5,362,448.

The ring opening may in principle also take place using monoalcohols or monoamines as starter compounds.

Also possible is the preparation of the polyamide component (P1) by polycondensation of alpha,omega-aminocarboxylic acids of the formula (I'):

HOOC—R—NH$_2$       (I')

where R=C$_{9-13}$ alkylene.

The polyamide component (P1) is used in the form of particles, more particularly as powder. The size distribution of the primary particles in the powder is determined by means of laser diffraction (ISO 13320-1:1999). Particularly suitable for this purpose is, for example, the Mastersizer 2000 from Malvern. The particle size median ($D_{50}$) is 20 to 100 μm, preferably 30 to 90 μm, more preferably 40 to 70 μm, and very preferably 50 to 60 μm.

If the particle size median ($D_{50}$) is below 20 μm, then identical, more particularly chemically identical, particles are included herein among the matting agents (M).

The melting point of the particles of the polyamide component (P1) according to DIN EN ISO 3146:2002-06 is preferably above 160° C., more preferably above 170° C. to 350° C.

Polyamides of these kinds are available for example from Evonik Industries AG, Essen, Germany under the Vestosint® brand.

The fraction of the polyamide component (P1) as a proportion of the total weight of the coating material composition is preferably 1 to 20 wt %, more preferably 5 to 15 wt %, and very preferably 8 to 12 wt %.

Generally it is the case that the roughness of the resulting surfaces of the coating films obtained from the coating materials of the invention can be controlled by way of the amount of the polyamide component (P1) that is used in the coating material. The higher the fraction of the polyamide component (P1) as a proportion of the total weight of the coating material, the rougher the surface of the cured coating film obtained from the coating material.

Polycarboxamide Component (P2)

A polycarboxamide is an amidated polycarboxylic acid. The polycarboxamide component (P2) of the present invention may be represented by the structural formula

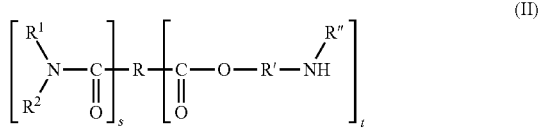

(II)

where
s is 1, 2 or 3,
t is 0 or 1, and
s+t is 2 or 3,
R is an (s+t)-valent organic radical selected from the group consisting of
  (a) aliphatic hydrocarbon groups having 2 to 60 carbon atoms,
  (b) aliphatic or aliphatic-aromatic radicals containing 2 to 8 carboxamide groups and additionally 6 to 150 carbon atoms in the form of hydrocarbyl radicals, and
  (c) aliphatic radicals containing 2 to 75 ether groups (—O—) and additionally 4 to 150 carbon atoms in the form of hydrocarbyl radicals,
  (d) aromatic hydrocarbon groups having 6 to 20 carbon atoms,
$R^1$ is hydrogen or $C_nH_{2n}R^3$, in which n is 2 to 6 and $R^3$ is hydrogen or a radical of the structure $(X)_p$—$R^4$, in which p is 0 or 1 and, if p is 0, the radical $R^4$ is OH, and, if p is 1, the radical X is an oxygen atom or a carboxylic ester group, and $R^4$
  i. is an aliphatic hydrocarbyl radical containing 1 to 3 hydroxyl groups and having 2 to 80 carbon atoms, or
  ii. is an aliphatic radical containing 1 to 3 hydroxyl groups, containing 0 to 39 groups selected from the group of ether groups (—O—) and carboxylic ester groups, and additionally containing 2 to 80 carbon atoms in the form of hydrocarbyl radicals,
and $R^2$ is a radical $C_nH_{2n}$—$(X)_p$—$R^4$; and
—R'—NH—R" is
a radical —$C_nH_{2n}$—NH—$C_nH_{2n}$—$(X)_p$—$R^4$,
a radical —$R^{4'}$—X—$C_nH_{2n}$—NH—$R^1$ or
a radical —$R^{4'}$—X—$C_nH_{2n}$—NH—$C_nH_{2n}$—$(X)_p$—$R^4$,
in which
$R^{4'}$ is an aliphatic hydrocarbyl radical containing 0 to 2 hydroxyl groups and having 2 to 80 carbon atoms, or
$R^{4'}$ is an aliphatic radical containing 0 to 2 hydroxyl groups, containing 0 to 39 groups selected from the group of ether groups and carboxylic ester groups, and additionally containing 2 to 80 carbon atoms in the form of hydrocarbyl radicals.

The polycarboxamide component (P2) is therefore a polyhydroxypolycarboxamide component (P2).

The concept of "valence" in relation to R relates to the number of bonds of the radical R to the s [$R^1R^2$N—CO] and to the t [CO—O—R'—NHR"] radicals.

R preferably is an (s+t)-valent organic radical selected from the group consisting of
  (a) aliphatic hydrocarbon groups having 6 to 44, more preferably 34 to 42, carbon atoms,
  (b) aliphatic radicals containing 2 carboxamide groups and additionally 70 to 90 carbon atoms in the form of hydrocarbyl radicals, and
  (c) aliphatic radicals containing 3 to 13 ether groups (—O—) and additionally 6 to 26 carbon atoms in the form of hydrocarbyl radicals.

Preferably both radicals $R^1$ and $R^2$ independently of one another possess the structure $C_nH_{2n}$—$(X)_p$—$R^4$.

The polycarboxamide component (P2) may be obtained for example by reaction of
(A) a polycarboxylic acid (III) or a polycarboxylic ester (III)

(III)

in which
R, s, and t are defined as above, and
$R^5$ is hydrogen or an alkyl radical having 1 to 6 carbon atoms; or
a corresponding anhydride of the formula (III')

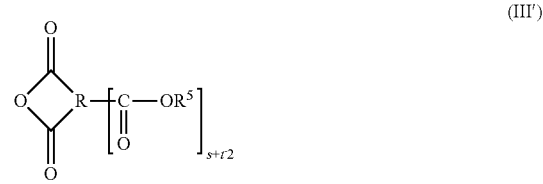

(III')

and
(B) a primary or secondary amine of the formula $HNR^1R^2$, in which $R^1$ and $R^2$ are defined as above.

Since the amine of the formula $NHR^1R^2$ contains not only the NH group but additionally, in the radical $R^1$ and/or radical $R^2$, at least one hydroxyl group, the amine is able to react not only via its amino group with the component of the formula (III) or (III'), but also via a hydroxyl group. This is represented in the general formula (II) by the indices s and t. The s amide units are formed by the reaction of component (III) or (III') with the NH group of the amine $NHR^1R^2$, while the t ester units are formed by reaction of component (III) or (III') with a hydroxyl group in one of the radicals, $R^1$ or $R^2$, of the amine $NHR^1R^2$.

Typical polycarboxylic acids of the formula (III) are, for example, those having aliphatic hydrocarbyl radicals R of 2 to 60 carbon atoms. The shortest-chain representative is succinic acid. It may also be used as the anhydride in accordance with the formula (III'). However, it is also possible to use what are called dimer fatty acids or trimer fatty acids, which are representatives of the particularly long-chain aliphatic hydrocarbyl radicals R.

Radicals R containing acid amide groups may be obtained, for example, by linking two dicarboxylic acid molecules to one diamine molecule, thus forming in turn a dicarboxylic acid, which contains two carboxamide groups in the radical R. If, for example, a polyether diol rather than the diamine is selected for linking, ether groups can be introduced in this way into the radical R.

Typical representatives of carboxylic acids with an aromatic radical R are, for example, phthalic acid and its anhydride, terephthalic acid and its anhydride, or their methyl esters.

Particularly preferred amines $NHR^1R^2$ are, for example, dialkanolamines. Preferred dialkanolamines contain alkanol radicals having 2 to 6 carbon atoms, preferably 2 to 4, and more preferably 2 to 3 carbon atoms. Especially preferred amines $NHR^1R^2$ are diethanolamine and diisopropanolamine.

The dialkanolamines may also be converted by reaction with lactones into radicals containing carboxylic ester groups. Preferred lactones are, for example, ε-caprolactone and δ-valerolactone.

The dialkanolamines can also be converted by reaction with compounds containing oxirane groups (oxiranes) such as glycidol, for example. In the case of the reaction with glycidol, for example, a radical having two hydroxyl groups is formed.

As is apparent from the definition of the indices s and t, on average at least 50% of the groups $COOR^5$ are reacted to form amide.

Polycarboxamides (P2) of this kind are prepared for example in accordance with DE 37 06 860 A1.

The fraction of the polycarboxamide component (P2) as a proportion of the total weight of the coating material composition is preferably 0.01 to 1.0 wt %, more preferably 0.02 to 0.50 wt %, and very preferably 0.05 to 0.20 wt %.

The fraction of polycarboxamide component (P2) based on the fraction of the polyamide component (P1) in the coating material is preferably 0.2 to 5.0 wt %, more preferably 0.3 to 2.5 wt %, and very preferably 0.5 to 1.0 wt %.

Further Components of the Coating Material

The coating materials of the invention may comprise further components. These include, in particular, organic solvents or additives such as, for example, UV absorbers, light stabilizers, flow control agents, catalysts for catalyzing the crosslinking reactions, defoamers, radical scavengers, adhesion promoters, rheological assistants, film-forming assistants, slip additives, flame retardants or dyes.

The coating material compositions of the invention are customarily substantially water-free, meaning that their water content is preferably less than 1.0 wt %, more preferably less than 0.5 wt %, and very preferably less than 0.2 wt %, based on the total weight of the coating material composition.

Suitable solvents for the coating materials of the invention are, in particular, those which in the coating material are chemically inert toward the compounds (A) and (B) and which also do not react with (A) and (B) when the coating material is cured. Examples of such solvents are aprotic solvents, such as, for example, aliphatic and/or aromatic hydrocarbons such as toluene, xylene, Solventnaphtha®, Solvesso 100 or Hydrosol® (from ARAL), ketones, such as acetone, methyl ethyl ketone or methyl amyl ketone, esters, such as ethyl acetate, butyl acetate, pentyl acetate or ethyl ethoxypropionate, ethers, or mixtures of the aforesaid solvents. Protic solvents such as n-butanol, for example, ought to be used, if at all, in minor amounts, preferably in amounts of 0 to 0.5 wt %, more preferably 0 to 0.2 wt %, based on the coating material composition.

Although the coating material compositions of the present invention need not contain any additional matting agents (M), such agents may nevertheless be used in the context of the invention if a certain matting is desired in addition to the structuring by component (P1). Where matting agents (M) are used, this is customarily done in an amount which lies below the matting agent quantities of the coating material compositions known from the prior art. Matting agents (M) which can be used are, for example, silicas, preferably fumed silicas such as Acematt® 3300, for example. The size distribution of the primary particles of the matting agents (M) is determined like that of the polyamide component (P1).

Other matting agents which can be used, however, are polyamides having a particle size median ($D_{50}$) of less than 20 μm, preferably 3 to 19 μm, more preferably 5 to 15 μm.

The particle size median ($D_{50}$) of the matting agent particles is below the median of the particles of the polyamide component (P1) used in the coating material. It is usually determined by the same method. The particle size median ($D_{50}$) of the matting agent particles is preferably 3 to 19 μm, more preferably 5 to 15 μm.

If matting agents (M) are used, their particle size median ($D_{50}$) is preferably lower by at least 10 μm, more preferably by at least 25 μm, and very preferably by at least 30 μm or even 40 μm than that of the polyamide component (P1).

If matting agents (M) are used, they are preferably employed in an amount of 0.5 to 4.0 wt %, more preferably 1.0 to 2.0 wt %, and very preferably 1.5 to 2.5 wt %, based on the total weight of the coating material composition.

The weight ratio of the matting agent component (M) in relation to the polyamide component (P1) is preferably from 1:10 to 8:10 and more preferably 1:10 to 6:10, and very preferably 1:10 to 3:10. As the ratio of matting agent (M) to polyamide component (P1) increases, there is typically a decrease in the structuring effect and an increase in the matting.

In one particularly preferred embodiment, the coating material composition contains no matting agents (M), more particularly no silicas.

Process for Producing the Coating Material Compositions of the Invention

Production of the coating material compositions of the invention requires no particular preparation of the polyamide component (P1) or of the matting agents (M) optionally employed, in the form of pastes.

Instead, the components which are liquid at room temperature (25° C.) can be introduced wholly or partially, and the components which are solid at room temperature can be stirred in subsequently, with stirring using standard commercial paint mixing equipment.

Production of Multicoat Paint Systems

The coating material compositions of the invention are customarily employed as the last coating film, in other words the outermost coating film which, accordingly, is the most distant from the substrate.

Customarily, and with particular preference, this coating film is a clearcoat film, in other words a coating film which is unpigmented and is colored optionally with soluble dyes.

Coating may take place, for example, wet on wet with underlying coating films, with which the topmost coating film is jointly cured.

Since the coatings of the invention produced from the coating materials of the invention exhibit outstanding adhesion even to electrocoat systems, surfacer systems, basecoat systems or clearcoat systems that have already cured, they are outstandingly suitable not only for use in automotive OEM finishing but also, following addition of corresponding catalysts where appropriate, for automotive refinishing or the coating of plastics.

Application of the coating materials of the invention may take place by any customary application methods, such as spraying, knifecoating, brushing, pouring, dipping, impregnating, trickling or rolling, for example. At application, the substrate to be coated may itself be at rest, with the application equipment or unit being moved. Alternatively, the substrate to be coated, more particularly a coil, may be moved, with the application unit being at rest relative to the substrate or being moved appropriately.

Preference is given to employing spray application methods, such as, for example, compressed air spraying, airless spraying, high-speed rotation, electrostatic spray application (ESTA), optionally in conjunction with hot spray applications such as hot air spraying, for example.

The dry film thickness of the film produced with the coating material composition of the invention, preferably the clearcoat film, ought preferably to be at least 15 µm, more preferably at least 20 µm, in order to ensure the construction of a uniform film. The dry film thickness ought preferably to be in the range from 15 µm to 80 µm, more preferably in the range from 20 µm to 70 µm, very preferably in the range from 25 µm to 60 µm or 30 µm to 50 µm. The dry film thicknesses were determined by microscope. The details of the determination can be found in the experimental section of the present invention. In any case, the selected dry film thickness is guided preferably by the particle size of the polyamide component (P1). Hence by the view to the quality of the structuring effect, particularly the regularity of the structuring, it is advantageous if the dry film thickness is less than the particle size median ($D_{50}$) of the primary particles of the polyamide component (P1). If the dry film thickness is significantly higher than the aforesaid $D_{50}$, the structuring effect is increasingly lost or becomes too irregular.

Curing of the applied coating materials of the invention may take place after a certain rest time. The rest time is used, for example, for the flow and the devolatilization of the coating films, or the evaporation of volatile constituents such as solvents. The rest time may be assisted and/or shortened through the application of elevated temperatures and/or by means of a reduced atmospheric humidity, provided this does not entail any damage or change to the coating films, such as premature complete crosslinking, for instance.

The thermal curing of the coating materials has no peculiarities in terms of method, instead taking place in accordance with the customary and known methods such as heating in a forced air oven or irradiation with IR lamps. The thermal curing here may also take place in stages.

The thermal curing takes place advantageously at a temperature of 30 to 200° C., more preferably 40 to 190° C., and more particularly 50 to 180° C., for a time of 1 min up to 10 h, more preferably 2 min up to 5 h, and more particularly 3 min to 3 h; at the temperatures of preferably between 30 and 90° C. that are employed for automotive refinishing and for the finishing of ancillary components, longer cure times may also be employed.

Generally after addition of a suitable catalyst, and even on curing at low temperatures of at most 90° C., as are customary in the sector of the coating of plastics parts, for automotive ancillary components, for example, or in the area of automotive refinish, the coating materials result in coatings having very good optical quality. At the same time the coating materials of the invention exhibit good circulation line stability.

The coating materials, moreover, have good sedimentation stability, meaning that even after prolonged storage of several months, for example, the coating materials at ambient temperature do not exhibit any sediment formation that could not be reagitated, either with difficulty or not at all, within a maximum of 1 h using a customary laboratory mixer (particularly Vollrath 370W, model, EWTHV 0.5" from Paul Vollrath GmbH & Co. KG, Hirth, rotational speed 800 revolutions per minute, Lenart disk d=90 mm) at a speed of 800 revolutions per minute.

The coating materials of the invention, moreover, produce new, cured coatings, more particularly paint systems, especially clearcoat systems, moldings, especially optical moldings, and self-supporting films having a rough surface.

The coating materials of the invention are therefore outstandingly suitable as decorative, protective and/or effect-imparting, highly scratch-resistant coatings and finishes on bodies of means of transport (especially powered vehicles, such as motorcycles, buses, trucks or automobiles) or of parts thereof; on the interior and exterior of edifices; on furniture, windows, and doors; on shaped plastics parts, especially CDs and windows; on small industrial parts, on coils, containers, and packaging; on white goods; on films; on optical, electrical, and mechanical components; and also on hollow glassware and articles of everyday use.

The coating materials and finishes of the invention, particularly the clearcoat systems, are employed more particularly in the technologically and esthetically especially demanding field of automotive OEM finishing and also of automotive refinishing. With particular preference the coating materials of the invention are used in multistage coating processes, especially in processes wherein first of all a pigmented basecoat film is applied to an optionally precoated substrate, and thereafter a film with the coating materials of the invention is applied.

Not only water-thinnable basecoat materials but also basecoat materials based on organic solvents can be used. Suitable basecoat materials are described for example in EP-A-0 692 007 and in the documents recited therein at column 3, lines 50 ff. The applied basecoat material is preferably first dried, meaning that, in an evaporation phase, at least part of the organic solvent and/or the water is removed from the basecoat film.

Drying takes place preferably at temperatures from room temperature to 80° C. After the drying, the coating material of the invention is applied. The two-coat finish is subsequently baked, preferably under conditions employed in automotive OEM finishing, at temperatures of 30 to 200° C., more preferably 40 to 190° C., and more particularly 50 to 180° C., for a time of 1 min up to 10 h, more preferably 2 min up to 5 h, and more particularly 3 min to 3 h; in the case of the temperatures employed for automotive refinishing and for the finishing of parts for installation on or in vehicles, of preferably between 30 and 90° C., longer cure times may also be employed.

A further subject of the present invention is the use of a formulation comprising at least one polyamide component (P1) and at least one polycarboxamide component (P2) as an additive in coating material compositions for producing structured, preferably glossy, paint systems, preferably clearcoat systems. The ratio of the two components (P1) and (P2) in the formulation preferably already corresponds to the ratio of the two components in the finished coating material system.

Use in accordance with the invention takes place preferably in coating material compositions comprising the above-described components (A) and (B).

The invention is elucidated in more detail below by means of examples.

EXAMPLES

Unless noted otherwise, all figures are in parts by weight.

Inventive clearcoat materials B1 and B2 are produced. Inventive clearcoat B1 is obtained from 100 parts by weight of the base varnish S1 (see table 1) and 33 parts by weight of the curing agent H (see table 2). Inventive clearcoat B2 is obtained from 106.7 parts by weight of the base varnish S2 (see table 1) and 33 parts by weight of the curing agent H (see table 2). For both inventive clearcoats, accordingly, the ratio of the polyol component (A) to the isocyanate component of the curing agent is identical.

TABLE 1

| | Base varnish | |
|---|---|---|
| | S1 | S2 |
| Poly component (A)[1] | 67 | 67 |
| Butyldiglycol acetate | 6 | 6 |
| Butylglycol acetate | 3.6 | 3.6 |
| Butyl acetate | 5.4 | 5.4 |
| Solvent naphtha 160/180 | 2.7 | 2.7 |
| Ethoxypropyl acetate | 4.4 | 4.4 |
| Butanol | 0.15 | 0.15 |
| UV absorber | 1.0 | 1.0 |
| HALS | 0.9 | 0.9 |
| Polyether-modified polydimethylsiloxane (flow control agent) | 0.35 | 0.35 |
| Polycarboxamide component (P2)[2] | 0.2 | 0.2 |
| Polyamide component (P1)[3] | 5.5 | 15 |
| Matting agent (M)[4] | 2.8 | 0 |

[1] Poly(meth)acrylate polyol component based on 2-hydroxypropyl methacrylate, cyclohexyl methacrylate, 2-ethylhexyl methacrylate, 2-ethylhexyl acrylate, and acrylic acid (65% form; drying: 1 h, 150° C.); OH number: 180 mg KOH/g, $M_w$: about 4650 g/mol, acid number: about 7 mg KOH/g;
[2] Polyhydroxycarboxamide
[3] Polyamide 12, $D_{50}$: 57 μm
[4] Fumed silica; $D_{50}$: 10 μm The liquid base varnish components are premixed. The solids are added subsequently with stirring using a Lenart disk. The mixture is stirred for about 20 minutes. Mixing takes place with a laboratory mixer (Vollrath 370W, model "EWTHV 0.5" from Paul Vollrath GmbH & Co. KG, rotary speed 1200 rpm, toothed disk d=90 mm) at about 800-1000 rpm.

TABLE 2

| | Curing agent H |
|---|---|
| Aliphatic polyisocyanate based on HDI trimers (isocyanurates) | 80.6 |
| Solvent Naphtha 160/180 | 9.7 |
| Butyl acetate | 9.7 |

Comparison of Different Structuring Agents

As an inventive example, the clearcoat of example B1 was used (polyamide component (P1); polyamide 12, $D_{50}$=57 μm). To produce the noninventive clearcoats, component P1 in the base varnish S1 was replaced in equal amounts by the structuring agents 1 to 3 specified in table 3. This gives, accordingly, the comparative clearcoats VB1 (structuring agent 1), VB2 (structuring agent 2), and VB3 (structuring agent 3).

TABLE 3

| Name | Chemical description | Particle size median ($D_{50}$ in μm) |
|---|---|---|
| Polyamide component (P1) | Polyamide 12 | 57 |
| Structuring agent 1 (comparative) | Methylpolyurea | 31 |
| Structuring agent 2 (comparative) | Polypropylene | 40 |
| Structuring agent 3 (comparative) | Copolyester | 39 |

The inventive clearcoat of example B1 and the noninventive clearcoats VB1, VB2, and VB3 were applied by pneumatic application to a metallic substrate (dry film thickness: 40 μm; flash-off time: 7 min at 23° C.; drying: 20 min at 140° C.) already coated with a cathodic electrocoat material (Cathoguard 500), an aqueous surfacer (FU48-9000; 25-30 μm dry film thickness; flash-off time: 10 min at 23° C.; drying 8 min 70° C.; baking: 17 min at 155° C.) from BASF Coatings GmbH, and a black aqueous basecoat (WB040; dry film thickness 10-15 μm; flash-off time: 5 min at 23° C.) from BASF Coatings GmbH.

The dry film thickness of the clearcoat films formed from the coating materials of examples B1, VB1, VB2 and VB3 was 40 μm.

Determination of the Dry Film Thicknesses

The dry film thicknesses were determined microscopically at 500 times magnification in a ground section method. For this purpose, a piece of the coated substrate measuring approximately 2 cm×2 cm was cut out. The sample was fastened perpendicularly in a mount, which was placed into an embedding mold (diameter about 40 mm). A curable two-component epoxy embedding compound was mixed from 21 parts by weight of Epofix resin and 2.7 parts by weight of Epofix hardener (both from Struers GmbH, Willich, Germany), and this compound was poured into the embedding mold. The embedding compound was cured in the embedding mold for 18 hours. The cured embedding compound with the sample enclosed therein was subsequently removed, ground, and polished. Film thickness measurement took place by means of a microscope (Olympus BX51; reflected light dark field and transmitted light). The dry film thickness of the structured clearcoat was measured at the locations where no particles of structuring agent were apparent.

Constant Condensation Conditions Test

To verify the adhesive strength, the samples were exposed for 240 hours to a constant condensation conditions test in accordance with DIN EN ISO 6270-1: 2002-02 and then examined for blushing after an hour of reconditioning. The results are set out in table 4.

Surface Characterization (Regularity of Structure)

The surface characterization took place both via the tactile quality of the surface and via use of white-light interferometry (psurf mobile instrument from NanoFocus AG, Oberhausen, Germany), allowing the structure of the surface to be ascertained. The term "regularity" denotes a uniform distribution of the particles on the clearcoat surface, which in principle can also be evaluated on a visual basis. By means of the psurf mobile instrument, however, it is possible additionally to determine the height of the particle parts protruding from the clearcoat, which ought, in the sense of regularity, to exhibit very little variation. The results are set out in table 4.

Daimler Gradient Oven Test

In the Daimler gradient oven test (Daimler test method PBODC 371), investigations were carried out in particular into the resistance to fully demineralized water and to pancreatin. Only in the case of polyamide component (P1) was it possible to find resistance to both substances even at temperatures above 81° C. The results are set out in table 4.

Scratch Resistance (AMTEC)

The scratch resistance was determined in accordance with the AMTEC laboratory car wash test to DIN EN ISO 20566 (2007-01). The results are set out in table 4.

TABLE 4

| | Test | | | |
|---|---|---|---|---|
| | B1 | VB1 | VB2 | VB3 |
| Constant condensation conditions test | Minimal blushing | Very severe blushing | Severe blushing | Slight blushing |
| Regularity of structure | +++ | + | ++ | + |
| Gradient oven test (Daimler) | +++ | + | +++ | ++ |
| Scratch resistance (AMTEC) | +++ | ++ | ++ | + |

+++: very good
++: good
+: still good

Sedimentation Behavior 100 g of the base varnish were introduced into a 200 ml wide-neck glass bottle and stored at room temperature for 7 days.

TABLE 5

| | Base varnish | |
|---|---|---|
| | VS1 (comparative) | S3 |
| Polyol component (A)[1] | 73 | 73 |
| Butyldiglycol acetate | 6.5 | 6.5 |
| Butylglycol acetate | 4 | 4 |
| Butyl acetate | 6.13 | 6.13 |
| Solvent naphtha 160/180 | 3 | 3 |
| Ethoxypropyl acetate | 4.77 | 4.77 |
| Butanol | 0.15 | 0.15 |
| UV absorber | 1.1 | 1.1 |
| HALS | 1 | 1 |

TABLE 5-continued

| | Base varnish | |
|---|---|---|
| | VS1 (comparative) | S3 |
| Polyether-modified polydimethylsiloxane (flow control agent) | 0.35 | 0.35 |
| Polycarboxamide component (P2)[2] | 0 | 0.2 |
| Polyamide component (P1)[3] | 6 | 6 |
| Matting agent (M)[4] | 3 | 3 |
| | Sediment | No sediment |

[1]Poly(meth)acrylate polyol component based on 2-hydroxypropyl methacrylate, cyclohexyl methacrylate, 2-ethylhexyl methacrylate, 2-ethylhexyl acrylate, and acrylic acid (65% form; drying: 1 h, 150° C.); OH number: 180 mg KOH/g, $M_w$: about 4650 g/mol, acid number: about 7 mg KOH/g;
[2]Polyhydroxycarboxamide
[3]Polyamide 12, $D_{50}$: 57 µm
[4]Fumed silica; $D_{50}$: 10 µm In the absence of inventive component P2 from the base varnish (comparative base varnish VS1), an unwanted sediment is formed. In the case of the inventive base varnish there is no sediment.

Determination of Phase Separation

Phase separation was measured using a ruler. The results for the base varnishes S4 to S7 and S8 to S11 for different concentrations of component P2 are reported in table 6.

TABLE 6

| | Base varnish | | | | | | | |
|---|---|---|---|---|---|---|---|---|
| | S4 | S5 | S6 | S7 | S8 | S9 | S10 | S11 |
| Polyol component (A)[1] | 67 | 67 | 67 | 67 | 67 | 67 | 67 | 67 |
| Butyldiglycol acetate | 6 | 6 | 6 | 6 | 6 | 6 | 6 | 6 |
| Butylglycol acetate | 3.6 | 3.6 | 3.6 | 3.6 | 3.6 | 3.6 | 3.6 | 3.6 |
| Butyl acetate | 5.4 | 5.4 | 5.4 | 5.4 | 5.4 | 5.4 | 5.4 | 5.4 |
| Solvent naphtha 160/180 | 2.7 | 2.7 | 2.7 | 2.7 | 2.7 | 2.7 | 2.7 | 2.7 |
| Ethoxypropyl acetate | 4.4 | 4.4 | 4.4 | 4.4 | 4.4 | 4.4 | 4.4 | 4.4 |
| Butanol | 0.15 | 0.15 | 0.15 | 0.15 | 0.15 | 0.15 | 0.15 | 0.15 |
| UV absorber | 1 | 1 | 1 | 1 | 1 | 1 | 1 | 1 |
| HALS | 0.9 | 0.9 | 0.9 | 0.9 | 0.9 | 0.9 | 0.9 | 0.9 |
| Polyether-modified polydimethylsiloxane (flow control agent) | 0.35 | 0.35 | 0.35 | 0.35 | 0.35 | 0.35 | 0.35 | 0.35 |
| Polycarboxamide component (P2)[2] | 0.2 | 0.5 | 0.7 | 1.0 | 0.2 | 0.5 | 0.7 | 1.0 |
| Polyamide component (P1)[3] | 9 | 9 | 9 | 9 | 14 | 14 | 14 | 14 |
| Matting agent 4[4] | 8 | 8 | 8 | 8 | | | | |
| Matting agent 5[5] | | | | | 6 | 6 | 6 | 6 |
| Phase separation in nm | 12 | 11 | 11 | 10 | 27 | 26 | 25 | 22 |
| Sediment | no | no | no | no | no | no | no | no |

[1]Poly(meth)acrylate polyol component based on 2-hydroxypropyl methacrylate, cyclohexyl methacrylate, 2-ethylhexyl methacrylate, 2-ethylhexyl acrylate, andacrylic acid (65% form; drying: 1 h, 150° C.); OH number: 180 mg KOH/g, Mw: about 4650 g/mol, acid number: about 7 mg KOH/g;
[2]Polyhydroxycarboxamide
[3]Polyamide 12, $D_{50}$: 57 µm
[4]Polyamide 12, a; $D_{50}$: 11 µm
[5]Polyamide 12, $D_{50}$: 6 µm Circulation Line Stability The circulation line stability was tested by pumping base varnishes S1 and S2 (see table 1) around in a circulation line while exposing them to a shearing load, the prevailing conditions being as follows:

Pressure at the return flow monitoring valve: 10 bar
Back-and-forth strokes per minute: 18
Volume (back-and-forth stroke): 0.6 l Prior to the shearing load in the circulation line (turn over=TO=0) and after 100, 500, 720, 1500, and 2000 turns, respectively, in the circulation line, the gloss of the coatings at 60° is measured. Circulation line stability of the coating materials is sufficient when the gloss at an angle of 60° is increased by not more than 10 gloss units after shearing by pumped circulation within a circulation line. The gloss was measured in each case at 60° using a commercial Byk Gardner gloss device, micro-TRI-gloss, cat. No. 4520 from Byk Gardner. The results are set out in table 7.

TABLE 7

| Number of turns (=TO) in the circulation line | S1 | | S2 | |
|---|---|---|---|---|
| | Gloss at 60° | Difference relative to TO = 0 | Gloss at 60° | Difference relative to TO = 0 |
| 0 | 14 | 0 | 7 | 0 |
| 100 | 15 | 1 | 6 | −1 |
| 500 | 19 | 4 | 5 | −2 |
| 720 | 19 | 4 | 5 | −2 |
| 1500 | 21 | 7 | 5 | −2 |
| 2000 | 19 | 4 | 4 | −3 |

What is claimed is:

1. A coating material composition comprising
(i) at least one polyol component (A),
(ii) at least one crosslinking agent component (B) having groups reactive toward hydroxyl groups of component (A),
(iii) at least one polyamide component (P1) wherein the acid amide groups are connected by a saturated, aliphatic hydrocarbyl radical having 6 to 13 carbon atoms, said component being used in a particulate form wherein the size distribution of the primary particles, determined by laser diffraction, possesses a particle size median ($D_{50}$) of 20 to 100 μm, and
(iv) at least one polycarboxamide component (P2), wherein
the polycarboxamide component (P2) possesses the following structural formula

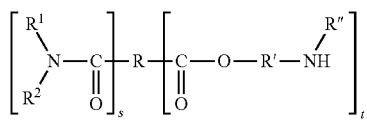

in which
s is 1, 2 or 3,
t is 0 or 1, and
s+t is 2 or 3,
R is an (s+t)-valent organic radical selected from the group consisting of
(a) aliphatic hydrocarbon groups having 2 to 60 carbon atoms,
(b) aliphatic or aliphatic-aromatic radicals containing 2 to 8 carboxamide groups and additionally 6 to 150 carbon atoms in the form of hydrocarbyl radicals,
(c) aliphatic radicals containing 2 to 75 ether groups and additionally 4 to 150 carbon atoms in the form of hydrocarbyl radicals, and
(d) aromatic hydrocarbon groups having 6 to 20 carbon atoms, $R^1$ is hydrogen or $C_nH_{2n}R^3$, in which n is 2 to 6 and $R^3$ is hydrogen or a radical of the structure $(X)_p-R^4$, in which p is 0 or 1 and, if p is 0, the radical $R^4$ is OH, and, if p is 1, the radical X is an oxygen atom or a carboxylic ester group,
and $R^4$
  i. is an aliphatic hydrocarbyl radical containing 1 to 3 hydroxyl groups and having 2 to 80 carbon atoms, or
  ii. is an aliphatic radical containing 1 to 3 hydroxyl groups, containing 0 to 39 groups selected from the group of ether groups and carboxylic ester groups, and additionally containing 2 to 80 carbon atoms in the form of hydrocarbyl radicals;
and $R^2$ is a radical $C_nH_{2n}-(X)_p-R^4$, wherein n, p, X and $R^4$ are defined as for $R^1$; and
R'—NH—R" is
  a radical $-C_nH_{2n}-NH-C_nH_{2n}-(X)_p-R^4$,
  a radical $-R^{4'}-X-C_nH_{2n}-NH-R^1$ or
  a radical $-R^{4'}-X-C_nH_{2n}-NH-C_nH_{2n}-(X)_p-R^4$,
  in which
  $R^{4'}$ is an aliphatic hydrocarbyl radical containing 0 to 2 hydroxyl groups and having 2 to 80 carbon atoms, or
  $R^{4'}$ is an aliphatic radical containing 0 to 2 hydroxyl groups, containing 0 to 39 groups selected from the group of ether groups and carboxylic ester groups, and additionally containing 2 to 80 carbon atoms in the form of hydrocarbyl radicals; and n, p, X and $R^4$ are as defined for $R^1$.

2. The coating material composition as claimed in claim 1, wherein the polyamide component (P1) is obtained by ring-opening polymerization of lactams of the following formula (I):

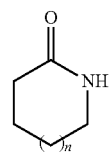

in which n=6 to 10; or
by polycondensation of alpha,omega-amino carboxylic acids of the formula (I'):

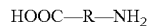

where R=$C_{9-13}$ alkylene.

3. The coating material composition as claimed in claim 1, wherein
R is an (s+t)-valent organic radical selected from the group consisting of
(a) aliphatic hydrocarbon groups having 6 to 44, carbon atoms,
(b) aliphatic radicals containing 2 carboxamide groups and additionally 70 to 90 carbon atoms in the form of hydrocarbyl radicals, and
(c) aliphatic radicals which contain 3 to 13 ether groups (—O—) and additionally 6 to 26 carbon atoms in the form of hydrocarbyl radicals.

4. The coating material composition as claimed in claim 1, wherein both radicals $R^1$ and $R^2$ independently of one another are the structure $C_nH_{2n}-(X)_p-R^4$.

5. The coating material composition as claimed in claim 1, wherein polycarboxamide component (P2) is obtained by reaction of
(A) a polycarboxylic acid (III) or a polycarboxylic ester (III)

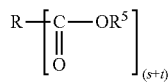
(III)

in which
R, s, and t are defined as in claim 1, and
$R^5$ is hydrogen or an alkyl radical having 1 to 6 carbon atoms; or
an anhydride of the formula (III')

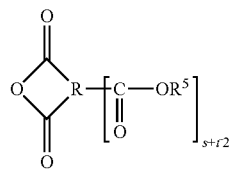
(III')

in which
R, $R^5$, s, and t are defined as above,
and
(B) a primary or secondary amine of the formula $HNR^1R^2$, in which $R^1$ and $R^2$ are defined as in claim 1.

6. The coating material composition as claimed in claim 5, wherein the amine $NHR^1R^2$ is a dialkanolamine or the reaction product of a dialkanolamine with lactones or oxiranes.

7. The coating material composition as claimed in claim 1, wherein the melting point of the polyamide component (P1) according to DIN EN ISO 3146:2002-06 is in the range from 160° C. to 350° C.

8. The coating material composition as claimed in claim 1, wherein the polyol component (A) has a hydroxyl number of 80 to 250 mg KOH/g and is selected from the group of polyester polyols, polyurethane polyols, polysiloxane polyols, and poly(meth)acrylate polyols.

9. The coating material composition as claimed in claim 8, wherein the polyol component (A) is a poly(meth)acrylate polyol.

10. The coating material composition as claimed in claim 1, wherein the crosslinking agent component (B) comprises one or more crosslinking agents selected from the group of crosslinking agents having free isocyanate groups, crosslinking agents having blocked isocyanate groups, amino resins, and tris(alkoxycarbonylamino)triazines.

11. The coating material composition as claimed in claim 10, wherein the crosslinking agent component (B) comprises or consists of one or more crosslinking agents selected from the group of crosslinking agents having free isocyanate groups.

12. The coating material composition as claimed in claim 11, wherein the crosslinking agent is selected from the group consisting of hexamethylene 1,6-diisocyanate, isophorone diisocyanate, and 4,4' methylenedicyclohexyl diisocyanate, their uretdione dimers, biuret dimers and/or isocyanurate trimers.

13. The coating material composition as claimed in claim 1, being free of silicas.

14. The coating material composition as claimed in claim 1, which comprises as matting agent (M) a silica whereof the size distribution of the primary particles has a particle size median ($D_{50}$) below the median of the particles of the polyamide component (P1) used in the coating material.

15. A process for producing a coating material composition as defined in claim 1, wherein the components which are liquid at 25° C. are included wholly or partially in the initial charge, and the components which are solid at 25° C. are stirred in subsequently, with any remainder of the components which are liquid at 25° C.

16. A multicoat paint system which comprises as outermost clearcoat a coat obtained from a coating material composition as claimed in claim 1.

17. The multicoat paint system as claimed in claim 16, the clearcoat possessing a dry film thickness in the range from 20 to 60 μm.

18. A method for producing structured coatings, the method comprising adding a formulation comprising at least one polyamide component (P1) as defined in claim 1 and at least one polycarboxamide component (P2) as defined in claim 1 as an additive to coating material compositions, and producing the structured coatings from the coating material compositions.

19. The coating material composition as claimed in claim 1, wherein
R is an (s+t)-valent organic radical selected from the group consisting of
(a) aliphatic hydrocarbon groups having 34 to 42 carbon atoms,
(b) aliphatic radicals containing 2 carboxamide groups and additionally 70 to 90 carbon atoms in the form of hydrocarbyl radicals, and
(c) aliphatic radicals which contain 3 to 13 ether groups (—O—) and additionally 6 to 26 carbon atoms in the form of hydrocarbyl radicals.

* * * * *